Dec. 29, 1959            L. P. SMITH            2,919,029

FILTER FOR MACHINE COOLANT

Filed Sept. 20, 1957            4 Sheets-Sheet 1

INVENTOR.
LEONARD P. SMITH
BY
Everett G. Wright,
ATTORNEY

Dec. 29, 1959 L. P. SMITH 2,919,029
FILTER FOR MACHINE COOLANT
Filed Sept. 20, 1957 4 Sheets-Sheet 2
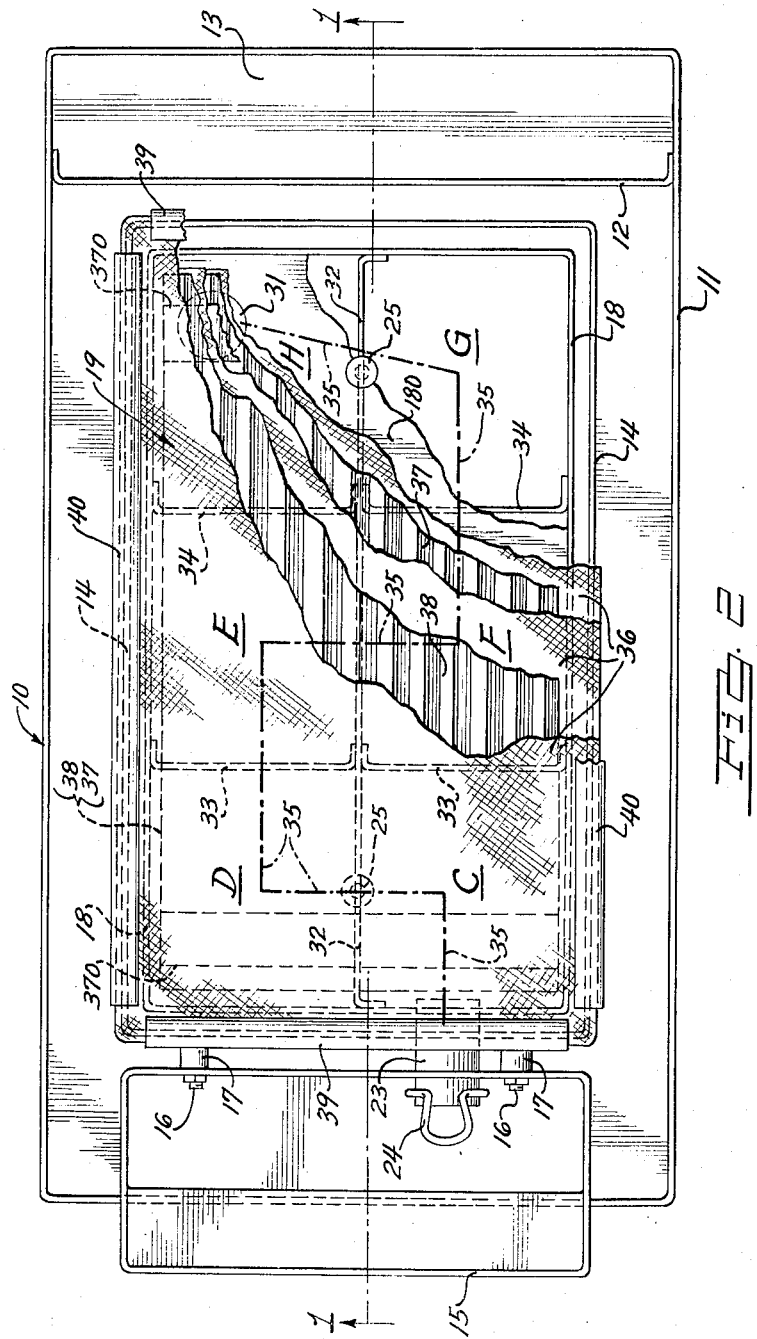
INVENTOR.
LEONARD P. SMITH
BY
ATTORNEY Dec. 29, 1959 L. P. SMITH 2,919,029
FILTER FOR MACHINE COOLANT
Filed Sept. 20, 1957 4 Sheets-Sheet 3
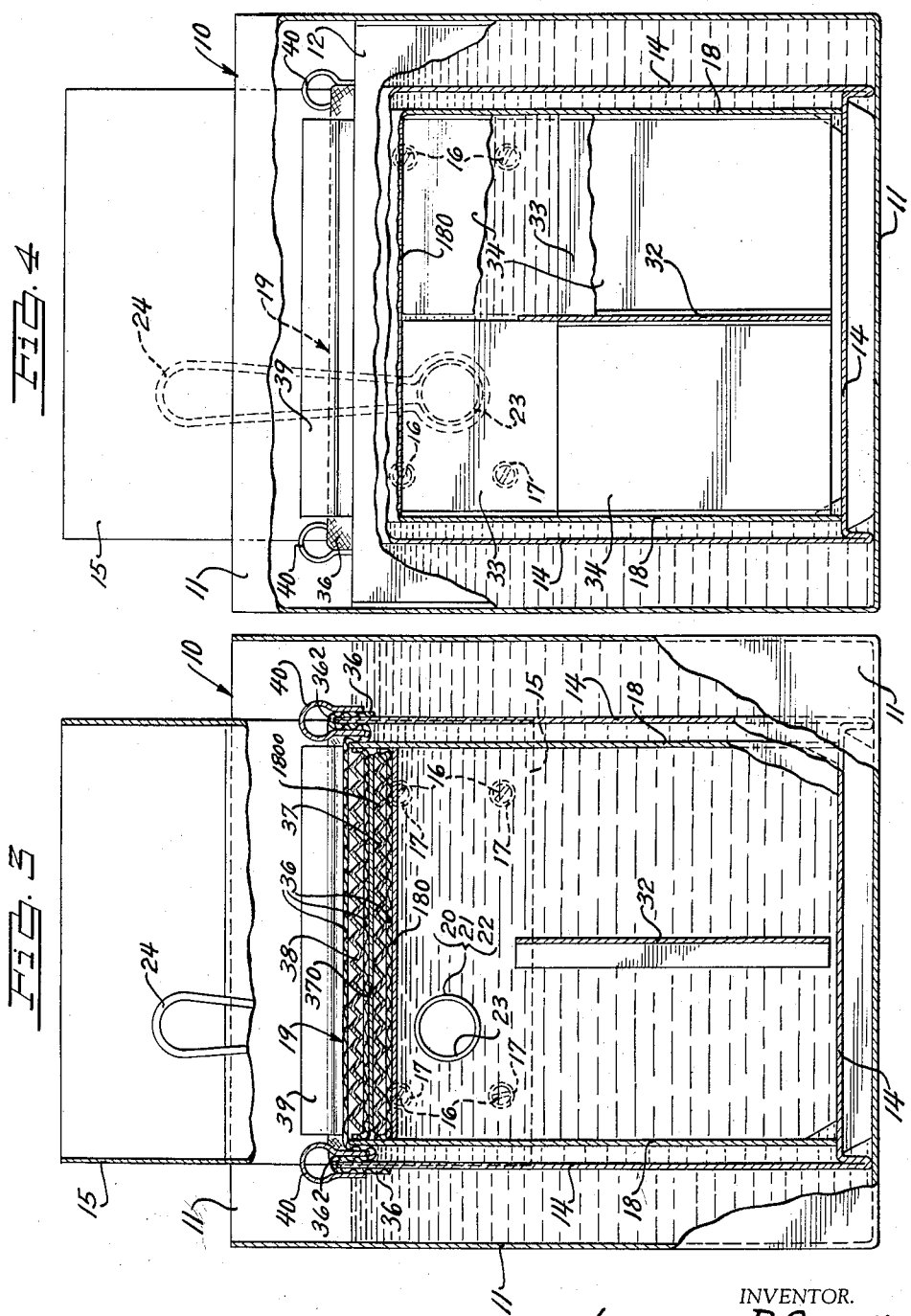
INVENTOR.
LEONARD P. SMITH
BY
ATTORNEY

United States Patent Office 2,919,029
Patented Dec. 29, 1959

2,919,029

FILTER FOR MACHINE COOLANT

Leonard P. Smith, Detroit, Mich.

Application September 20, 1957, Serial No. 685,263

3 Claims. (Cl. 210—305)

This invention relates to filter means for use in connection with machine tools such as power grinding machines and the like wherein a recirculating aqueous type coolant containing rust preventative and other compounds is employed.

In machine tools where fine metallic particles or chips or grinding wheel dust is washed away from the cutting element, a recirculating coolant system is ofttimes employed. In many machine tools an expensive filtering system is used sometimes including magnetic type filters. These filtering systems are not only costly but are difficult to maintain and clean.

With the foregoing in view, the primary object of this invention is to provide an improved, simplified and extremely effective recirculating type filter system for filtering coolant and other fluids in machine tools and the like.

Another object of the invention is to provide a filter for machine tools and the like that many be readily cleaned and maintained, and which employs inexpensive disposable filter cloths that can be readily replaced, the said cleaning and maintenance of the improved filter being accomplished with a minimum of machine-down time.

A further object of the invention is to provide a filter for machine tools and the like employing an efficient and effective combination of labyrinth drop-out and screening type filtering systems which are arranged for quick cleaning and filter replacement, and which includes an anti-overflow feature that automatically makes the recirculating fluid system inoperative if and when the filtering element should become clogged through extreme neglect in maintenance.

Other objects of the invention will become apparent by reference to the following detailed description taken in connection with the accompanying drawings, in which:

Fig. 2 is a top plan view of the filter shown in Fig. 1, also with portions successively broken away to clearly show the construction.

Fig. 3 is a cross sectional view taken on the line 3—3 of Fig. 1.

Fig. 4 is a view part in end elevation and part in cross section taken on the line 4—4 of Fig. 1.

Figure 1:
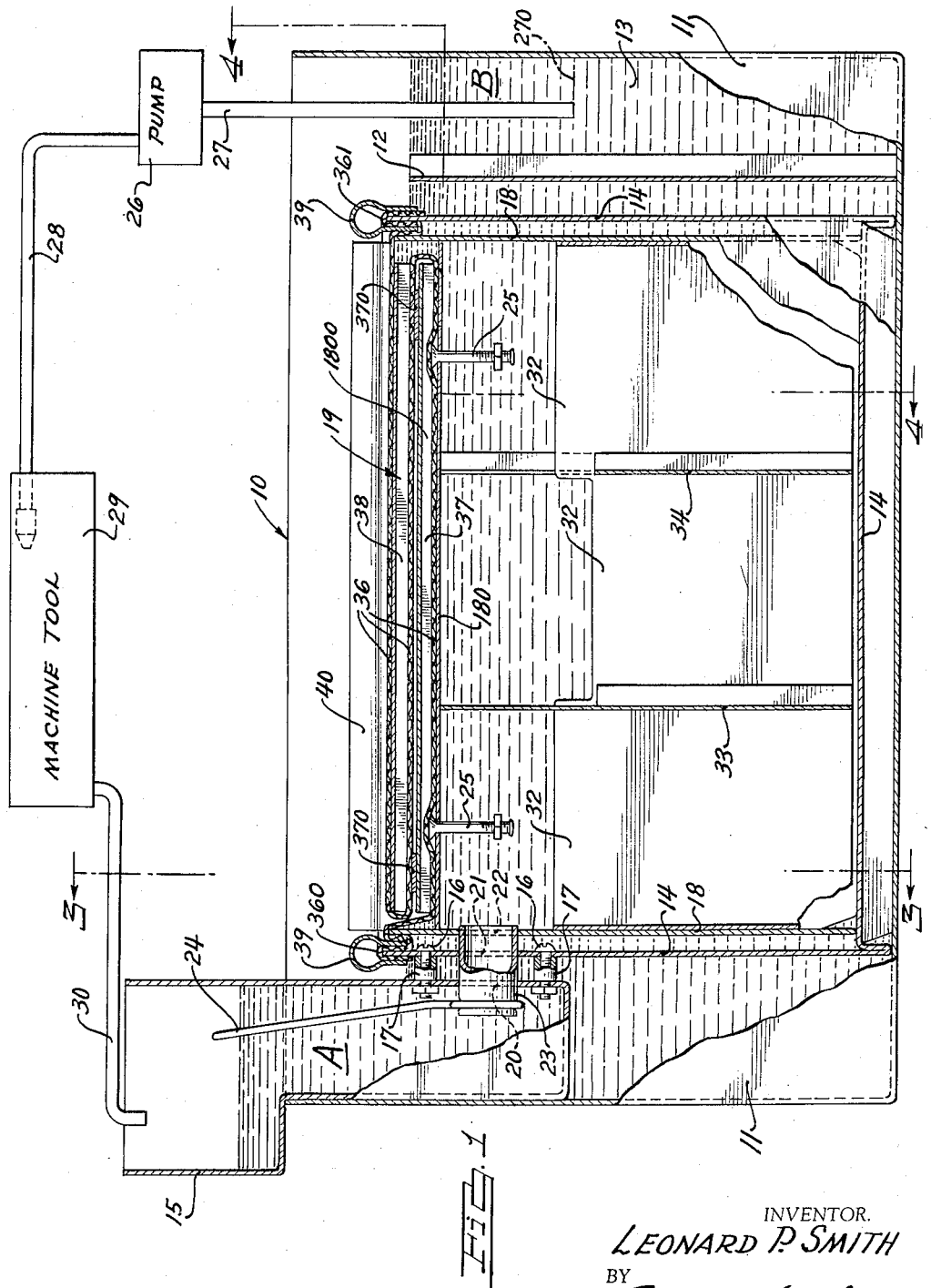
Fig. 1 is a side elevational view showing a machine tool coolant filter system embodying the invention taken substantially on the line 1—1 of Fig. 2, certain portions being successively broken away to clearly illustrate the invention.

Referring now to the drawings wherein like numerals refer to like and corresponding parts throughout the several views, the particular filter 10 embodying the invention disclosed for illustrative purposes comprises an outer open top tank 11 including a baffle 12 at one end thereof forming therein a pump sump chamber 13. Into the said outer tank 11 is telescopingly positioned an inner open top sludge collector tank 14 which includes an open top intake chamber 15 fixed by suitable studs 16 and spacers 17 in spaced relationship onto the end of the said sludge collector tank 14 disposed opposite the sump chamber 13 in the said outer tank 11. Into the said sludge collector tank 14 is telescopingly positioned an inverted or open bottom labyrinth drop-out tank 18 having its top panel 180 disposed somewhat below the upper edge of the sides and ends thereof whereby to provide a filter chamber 1800 in the top of the said labyrinth drop-out tank 18, a support for a filter element 19 and a free peripheral edge upon which to clamp the said filter element 19 as hereinafter described in detail.

To provide communication between the intake chamber 15 and the labyrinth drop-out tank 18, suitably aligned apertures 20, 21 and 22 are provided in the intake chamber 15, the sludge collector tank 14 and the labyrinth drop-out tank 18, the said aligned apertures being at an elevation near the bottom of the intake chamber 15, near the top of the sludge collector tank 14 and near the top of the laybrinth drop-out tank 18 but below the top panel 180 thereof, all as best shown in Fig. 1. After the said sludge collector tank 14 with the intake chamber 15 fixed thereon and the labyrinth drop-out tank 18 are telescoped successively into the outer tank 11 as viewed in Figs. 1 and 2, a removable connector hose 23 is telescoped through the said aligned apertures 20, 21 and 22 whereby to provide means through which coolant or the like may flow from the intake chamber 15 into the labyrinth drop-out tank 18 just below the top panel 180 thereof. A suitable wire handle 24 may be provided on the said removable connector hose 23 by means of which it may be readily telescoped through and removed from the said aligned apertures 20, 21 and 22. Lifting studs 25 or the like are telescoped through the top panel 180 of the labyrinth drop-out tank 18 for convenience in lowering it into or lifting it from the said sludge collector tank 14.

The foregoing construction was developed for the purpose of readily assembling the tank elements 11, 14 and 18 of the filter 10 and disassembling them for cleaning and disposal of sludge collected in the sludge collector tank 14 when the said filter 10 is cleaned.

In installing the filter 10 in a machine tool base or mounting the said filter 10 adjacent a machine tool or the like, a suction line or hose 27 extends from the coolant or other fluid circulating pump 26 to a level well below the top of the baffle 12 in the outer open top tank 11 which forms the pump sump chamber 13 therein. The volume A of the intake chamber 15 is somewhat greater than the volume B of the pump sump chamber 13 above the level 270 of the bottom of the pump suction hose 27 so that, should the filter element 19 of the filter 10 become clogged, the pump 26 will become starved and cease to function, thereby preventing any posisble overflow of the filter 10. The said circulating pump 26 pumps coolant or the like through a pressure line 28 to the machine tool 29 for use in the usual manner from which it drains through a drain line 30 to the said intake chamber 15, which circulating cycle is continuous just so long as the machine tool uses coolant or the like, the circulating pump 26 is running, and the filter element 19 does not become clogged.

The top panel 180 of the labyrinth drop-out tank 18 is provided with an outlet aperture 31 therethrough at the end thereof furthermost from the connector hose 23 through which coolant or the like enters the said labyrinth drop-out tank 18 from the intake chamber 15. The said inverted labyrinth drop-out tank 18 has no bottom except that which is provided by the bottom of the sludge collector tank 14 when the said inverted labyrinth drop-out tank 18 is telescoped thereinto. The particular labyrinth drop-out tank 18 disclosed in the drawings is preferably provided with one longitudinal baffle 32 and two cross baffles 33 and 34 forming a plurality of drop-out chambers C, D, E, F, G and H within the sludge collector tank 14 and the labyrinth drop-out tank 18; however, the tops of the said baffles 32, 33 and 34 are suitably disposed at or below the top panel 180 of the said labyrinth drop-out tank 18 as shown in the drawings to cause a meandering or labyrinth flow of coolant or other fluid along the upper portion of the said labyrinth drop-out tank 18 from the connector hose 23 along the path indicated by the dot and dash flow line 35 to the outlet aperture 30 in the top panel 180 thereof. During this meandering flow of coolant or other fluid through the labyrinth drop-out tank, heavy foreign particles in the said coolant or other fluid settle and collect in the form of a sludge in the bottom of the labyrinth chambers C, D, E, F, G and H. When the filter 10 is disassembled, the said sludge remains in the sludge collector tank 14 when the labyrinth drop-out tank 18 is lifted therefrom, thus permitting the sludge to be disposed of by emptying the sludge collector tank 14 during the cleaning of the filter 10.

Figure 5:
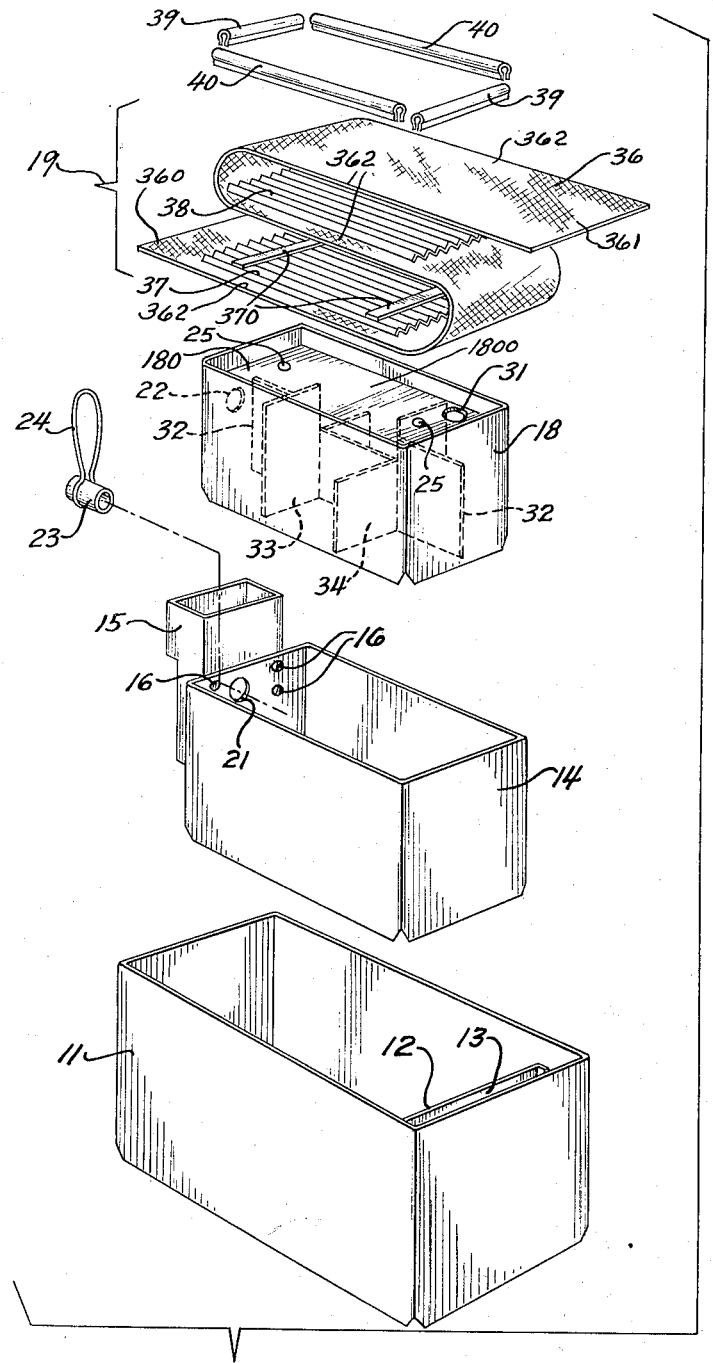
Fig. 5 is an exploded view in perspective showing the several elements of the invention in disassembled relationship.

The filter element 19 is constructed of a strip of filter cloth 36 or the like, folded lengthwise in a zig-zag fashion as best shown in Fig. 1 and indicated diagrammatically in Fig. 5 with rectangular longitudinally corrugated separators 37 and 38 disposed between the folds thereof. The separators 37 and 38 are of a size that will telescope freely into the filter chamber 1800 in the top portion of the labyrinth drop-out tank 18 above the top panel 180 thereof but below the upper peripheral edge of the walls of the said labyrinth drop-out tank 18. The filter cloth 36 is pulled tightly over the ends of the said separators 37 and 38 as best shown in Fig. 1. The filter cloth 36 is of such a generous length and width that the lower free end 360 thereof will fold over the upper edges of the left hand ends of the labyrinth drop-out tank 18 and the sludge collector tank 14 and the upper free end 361 thereof will fold over the upper edges of the right hand ends of the labyrinth drop-out tank 18 and the sludge collector tank 14. The said filter cloth is of such a generous width that the three-layer free side portions 362 thereof outside the separators 37 and 38 may be squeezed together and folded over the upper edges of the sides of the labyrinth drop-out tank 18 and the sludge collector tank 14 as indicated in Fig. 3. The lower separator 37 is provided with a plurality of cross bars 370 for the purpose of preventing the said separators 37 and 38 from nesting or tending to nest when the filter element 19 is assembled as hereinabove described.

The said filter element 19 including the filter cloth 36 and separators 37 and 38 may be asesmbled in situ or it may be preassembled and placed in the top depressed portion or filter chamber 1800 of the inverted or open-bottom labyrinth drop-out tank 18 resting on the said top panel 180 thereof. When so positioned, the free ends 360 and 361 and the free side portions 362 of the filter cloth 36 of the filter element 19 are clamped onto the upper ends and sides respectively of the sludge collector tank 14 by such suitable means as elongated plastic clips 39 and 40. The foregoing construction of the filter element 19 provides a filter area equivalent to three times the area of the labyrinth drop-out tank 18, and effectively lengthens the necessary interval of time the filter 10 is in service between filter cleanings. Inasmuch as the filter cloth 36 is essentialy yard-goods cut to the desired length, and is very inexpensive, a new filter cloth 36 may be used each time the filter 10 is cleaned, or, if preferred, the filter cloth 36 may be cleaned and re-used a number of times before it becomes torn or otherwise ineffective. Effluent from the top of the filter element 19 spills from the filter chamber 1800 into the outer tank 11 and overflows the baffle 12 therein into the pump sump chamber 13.

Although but a single embodiment of the invention has been disclosed and described in detail, it is obvious that many changes may be made in the size, shape, arrangement and detail of the various elements of the invention without departing from the spirit and scope thereof as defined by the appended claims.

I claim:

1. A filter apparatus for machine tool coolant and the like comprising an outer open top tank, and open top sludge collector tank telescoped within and removable from said outer tank and an open bottom labyrinth drop-out tank telescoped within and removable from the said sludge collector tank including a top panel disposed below the upper periphery thereof and vertically disposed longitudinal and transverse baffles arranged to provide a labyrinth passage for fluid therethrough at the upper portion of said tank below the said top panel thereof, an open top intake chamber fixed to said sludge collector tank, a filter element consisting of a plurality of longitudinally ribbed separators somewhat smaller than the top panel of the labyrinth drop-out tank and a continuout filter cloth wider than said separators and folded longitudinally thereunder, therebetween and thereover with an end extending beyond each end of said separators supported on the top panel of said labyrinth drop-out tank with the filter cloth extending over the upper periphery of said sludge collector tank, clip means removably securing the periphery of said filter cloth in sealed relationship to the upper periphery of said sludge collector tank, the said intake chamber, sludge collector tank and labyrinth drop-out tank having aligned apertures therethrough, and removable connector means extending through said aligned apertures introducing a flow of coolant from said intake chamber into one end of said labyrinth sludge collector tank just below the top panel thereof, said sludge collector tank having an outlet through its top panel at the opposite end thereof to below said filter element whereby coolant entering said labyrinth sludge collector tank drops its heavy foreign particles therein and passes through said filter for removal of light foreign particles and into said outer tank, the said outer tank having a pump sump chamber therein from whence filtered coolant may be removed.

2. A filter apparatus for machine tool coolant and the like comprising an outer open top tank, an open top sludge collector tank within said outer tank and an open bottom labyrinth drop-out tank within the said sludge collector tank including a top panel disposed below the upper periphery thereof and vertically disposed baffles therein providing a labyrinth passage for fluid therethrough at the upper portion of said tank adjacent the said top panel thereof, a filter element consisting of a plurality of separators and a continuous filter cloth wider than said separators folded longitudinally thereunder, therebetween and thereover with an end extending beyond each end of said separators, said portion of said filter element including said separators being supported on the top panel of said labyrinth drop-out tank and the said filter cloth extending over the upper periphery of said sludge collector tank, removable clip means securing the periphery of said filter cloth to and around the upper periphery of said sludge collector tank, means for introducing a flow of coolant into one end of said labyrinth sludge collector tank near the top thereof, said labyrinth sludge collector tank having an outlet through its top panel at the opposite end thereof to below said filter element whereby coolant entering said labyrinth sludge collector tank flows therethrough and drops its heavy foreign particles therein and passes through said filter for the removal of its light foreign particles and passes into said outer tank from whence the filtered coolant may be removed.

3. In a filter for making tool coolant, an outer open top tank, an inner open top sludge collector tank removably telescoped within said outer tank with the walls of said tanks in lateral spaced relationship, the said sludge collector tank including an open top intake chamber connected in spaced relationship to one end thereof and extending thereabove, and a closed top labyrinth drop-out tank having an open bottom removably telescoped within said sludge collector tank with the walls of said tanks disposed in spaced relationship, the said closed top of said labyrinth drop-out tank being disposed below the top of the walls thereof forming a filter chamber and a filter support, the said intake chamber, sludge collector tank and said labyrinth drop-out tank having aligned passages in adjoining walls thereof, removable passage means for spent coolant containing foreign particles from a machine tool removably telescoped through said aligned passages establishing communication between said intake chamber and one end of said labyrinth drop-out tank after said tanks are telescopingly assembled, the other end of the said labyrinth drop-out tank being apertured through the top thereof providing communication between the said labyrinth drop-out tank and said filter chamber, longitudinally folded fabric filter means disposed in and over said filter chamber and over the upper periphery of said sludge collector tank, and means removably securing the periphery of said fabric filter means to the upper periphery of said sludge collector tank, longitudinally corrugated filter separators disposed between the folds of said fabric filter means, the said labyrinth tank having its upper periphery disposed below the upper periphery of said sludge collector tank and the said sludge collector tank having its upper periphery disposed below the upper periphery of said outer tank whereby to permit overflow of filtered coolant from said filter means to said outer tank from which said filtered coolant may be pumped back to said machine tool for reuse, the entire filter construction being readily dis-assembled and re-assembled for cleaning of the sludge collector tank and replacement of the fabric filter.

References Cited in the file of this patent

UNITED STATES PATENTS

| | | |
|---|---|---|
| 748,981 | Oliver | Jan. 5, 1904 |
| 866,626 | Cook | Sept. 24, 1907 |
| 2,846,073 | Hopper | Aug. 5, 1958 |